2,989,244
SPRAYING APPARATUS
Edwin H. Matthewson, Saranac, Mich., assignor to Universal Metal Products Company, Saranac, Mich.
Filed July 30, 1958, Ser. No. 752,033
15 Claims. (Cl. 239—146)

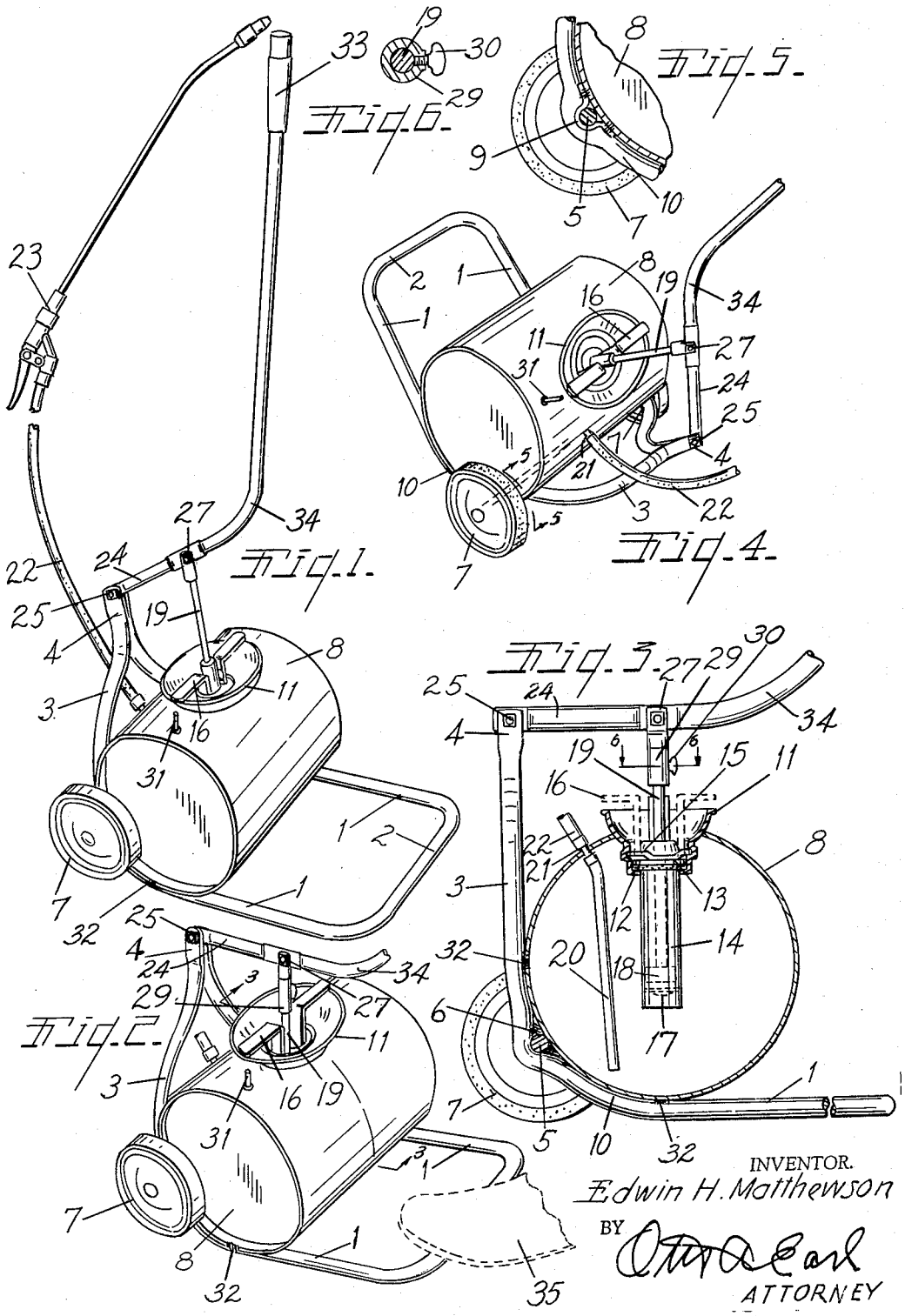

This invention relates to spraying apparatus of the manually manipulable type.

The main objects of this invention are:

First, to provide a wheeled sprayer of the manually manipulable type including an air pump and a handle adaptable as a pump handle and also as a handle for manipulating the sprayer on its wheels.

Second, to provide a wheeled sprayer which is readily adjusted from pumping position to use or spraying position, and one in which the major weight of the tank or receptacle in use position is supported by the wheels.

Third, to provide a wheeled sprayer which may be manipulated in use by a single handle which may be easily and quickly positioned for pumping or to manipulate the sprayer on its wheels.

Fourth, to provide a structure having these advantages which is relatively simple and economical in its parts.

Objects relating to details and economies of the invention will appear from the description to follow. The invention is defined and pointed out in the claims.

A preferred embodiment of the invention is illustrated in the accompanying drawing, in which:

FIG. 1 is a perspective view of a sprayer embodying my invention with the parts in non-use position, the hose being partially broken away.

FIG. 2 is a fragmentary perspective view illustrating the parts in position for pumping.

FIG. 3 is an enlarged fragmentary view partially in vertical section on a line corresponding to line 3—3 of FIG 2.

FIG. 4 is a fragmentary perspective view illustrating the sprayer in position for transporting or spraying, the handle and discharge hose being partially broken away.

FIG. 5 is an enlarged fragmentary view in section on a line corresponding to line 5—5 of FIG. 4 illustrating the connection for the receptacle to the axle.

FIG. 6 is an enlarged detail section on a line corresponding to line 6—6 of FIG. 3.

The embodiment of my invention illustrated comprises a frame having side members 1—1 connected at their front ends by the cross piece 2 integral therewith. The rear ends of these side members are extended upwardly into the converging arms 3, the ends 4 of which are disposed in side by side parallel relation.

The axle 5 is disposed in the angle formed by the juncture of the arms 3 and side members 1 and is fixedly secured thereto, desirably by welds shown conventionally at 6. The wheels 7 are mounted on the ends of the axle.

In the embodiment illustrated the receptacle or tank 8 is of cylindrical cross section and is disposed horizontally upon the frame side members 1 in supported relation to the arms 3 and is secured to the axle by means of the clips 9, see FIG. 5.

The frame side members 1 desirably have curved portions 10 adjacent the arms in which the receptacle is seated. The receptacle is provided with a filling funnel 11 desirably centrally located, as is illustrated. This funnel is provided with a seat 12 for the head 13 of the pump cylinder 14. The head 13 is provided with keeper engaging members 15 and with handles 16 for rotating the head to engage and disengage the keepers. The details of this connection are not illustrated as they form no part of this invention and this type of connection is known in the art.

The pump cylinder 14 is provided at its inner end with a discharge valve 17 shown conventionally. The plunger 18 is also conventionally illustrated and is provided with a piston rod 19 reciprocable in the cylinder head. The discharge pipe or conduit 20 is mounted on the receptacle at 21 to depend into the receptacle terminating adjacent the bottom thereof. The discharge hose 22 is connected to this discharge pipe or conduit 20 and is provided with a valved spray nozzle unit 23. The details of this spray nozzle unit 23 are not illustrated as units of this type suitable for use in this connection are known.

The handle 24 is adapted for use both as a pump handle and to manipulate the sprayer on its wheels. The handle 24 is pivotally mounted at 25 on the upper ends of the arms 3, in the embodiment illustrated being disposed between the parallel terminal end portions 4 thereof. The piston rod 19 is connected to the handle at 27. Although it is not of necessity required to enable the practical use of the handle as a pump handle and also as a sprayer manipulating handle, the pump rod, in the embodiment illustrated, the pump rod 19 is provided with a stop member 29 which is vertically adjustable thereon and secured in its adjusted position by the set screw 30. The stop member 29 is shown in FIGS. 2 and 3 in pumping position and in FIGS. 1 and 4 the stop is positioned so that the plunger rod constitutes a strut for the handle.

In pumping position the cross piece 2 of the side members 1 may desirably be engaged by the foot of an operator as is indicated at 35, FIG. 2. The handle is desirably angled at 34 as illustrated. The hose 22 is of such length that the operator may grasp the discharge or spray nozzle with one hand and the handle or grip 33 with the other hand. The frame parts and the handle are desirably formed of tubular stock.

The tank or receptacle is provided with a pressure relief valve 31 shown conventionally. This is desirable in view of the long leverage provided by the handle. The tank is desirably further connected to the frame by welds as indicated at 32 both to the side member and to the arms thereof, see FIG. 3.

The applicant is familiar with pressure type sprayers and it is common practice to provide the receptacles with handles for carrying and positioning at the spraying point. Some of these are adapted to contain three or four gallons of spray solution and they are very heavy and arduous labor is involved in using them. Sprayers embodying the features of the applicant's invention may be easily manipulated and with a minimum of effort.

I have illustrated and described my invention in a highly practical embodiment thereof. I have not attempted to illustrate and describe other embodiments or adaptations as it is believed this disclosure will enable those skilled in the art to embody or adapt the invention as may be desired.

Having thus described the invention what is claimed as new and desired to secure by Letters Patent is:

1. A sprayer comprising a receptacle provided with wheels, a frame comprising a rest at the front of the receptacle and having an upwardly projecting arm at the rear of the receptacle, an air pump unit discharging into said receptacle and provided with a piston rod projecting above the receptacle, a handle disposed above and transversely of said receptacle and pivotally mounted on said arm and to which said piston rod is connected for actuation by said handle as a pump handle, said handle also being adapted for use as a handle to translate the sprayer on its wheels, and a manually manipulatable valved discharge hose for said receptacle.

2. A sprayer comprising a receptacle provided with wheels, a frame comprising a rest at the front of the receptacle and having an upwardly projecting arm at the rear of the receptacle, an air pump unit discharging into said receptacle and provided with a piston rod projecting above the receptacle, a handle disposed above and transversely of said receptacle and pivotally mounted on said arm and to which said piston rod is connected for actuation by said handle as a pump handle, said handle also being adapted for use as a handle to translate the sprayer on its wheels, a pressure actuated relief valve for said receptacle, and a manually manipulatable valved discharge hose for said receptacle.

3. A sprayer comprising an elongated horizontally disposed receptacle, an axle supportingly connected to said receptacle and provided with wheels overlapping the ends of the receptacle, a frame comprising side members disposed adjacent the ends of the receptacle and connected thereto and having upwardly projecting converging arms at their rear ends, the frame side members projecting forwardly of said receptacle and having a connecting cross piece constituting a foot piece, an air pump including a cylinder discharging into said receptacle and provided with a piston rod projecting from the receptacle, a handle disposed above and transversely of said receptacle and pivotally mounted on said arms and to which said piston rod is connected for actuation by said handle as a pump handle, said handle having an angled outer end portion and being adapted for use as a handle to translate the sprayer on its wheels, and a discharge means for said receptacle including a hose provided with a valved nozzle at its outer end, said hose being of such length that the said nozzle and its valve may be manipulated by an operator while grasping the handle for manipulating the sprayer on its wheels.

4. A sprayer comprising an elongated horizontally disposed receptacle, an axle supportingly connected to said receptacle and provided with wheels overlapping the ends of the receptacle, a frame comprising side members disposed adjacent the ends of the receptacle and connected thereto and having upwardly projecting converging arms at their rear ends, the frame side members projecting forwardly of said receptacle and having a connecting cross piece constituting a foot piece, an air pump including a cylinder discharging into said receptacle and provided with a piston rod projecting from the receptacle, a handle disposed above and transversely of said receptacle and pivotally mounted on said arms and to which said piston rod is connected for actuation by said handle as a pump handle, said handle also being adapted for use as a handle to translate the sprayer on its wheels, and a discharge means for said receptacle.

5. A sprayer comprising a receptacle provided with wheels, a frame comprising a rest at the front of the receptacle and having an upwardly projecting arm at the rear of the receptacle, an air pump unit discharging into said receptacle and provided with a piston rod projecting above the receptacle, a handle disposed above and transversely of said receptacle and pivotally mounted on said arm and to which said piston rod is connected for actuation by said handle as a pump handle, said handle having an angled outer end portion and being adapted for use as a handle to translate the sprayer on its wheels, and a discharge means for said receptacle including a hose provided with a valved nozzle at its outer end, said hose being of such length that the said nozzle and its valve may be manipulated by an operator while grasping the handle for manipulating the sprayer on its wheels.

6. A sprayer comprising a frame including laterally spaced side members having a connecting crosspiece at one end thereof and having upwardly projecting converging arms at the other ends thereof, the frame side members having upwardly curved portions merging into said arms, an axle disposed on said frame at the juncture of said side members and arms, wheels on said axle disposed at the outer sides of said frame side members, a cylindrical receptacle disposed horizontally upon said frame side members and fixedly secured thereto in supported relation to said curved portions thereof and to said arms, said wheels being positioned at the end of said receptacle, an air pump including a cylinder insertable into and removable from said receptacle and detachably connected thereto, a piston coacting with said cylinder and provided with a piston rod projecting from said cylinder, a handle pivotally mounted on said arms of said frame and pivotally connected to said piston rod, the frame being tiltable on said wheels so that its side members may be disposed generally in horizontal supported engagement with the ground in which position said frame crosspiece constitutes a foot piece and the pump is in upright position facilitating the manipulation of the handle as a pump handle, and the frame may be positioned for ground clearance for translation and positioning of the sprayer for spraying use, and a discharge means including a hose connected to the receptacle and the hose being of such length that the spray nozzle thereof may be grasped for manipulation by an operator while the operator is grasping the handle for manipulation of the sprayer on its wheels.

7. A sprayer comprising a frame including laterally spaced side members having a connecting crosspiece at one end thereof and having upwardly projecting arms at the other ends thereof, an axle disposed on said frame, wheels on said axle disposed at the outer sides of said frame side members, a receptacle disposed upon said frame side members and fixedly secured thereto, an air pump including a cylinder insertable into and removable from said receptacle and detachably connected thereto, a piston coacting with said cylinder and provided with a piston rod projecting from said cylinder, a handle pivotally mounted on said arms of said frame and pivotally connected to said piston rod, the frame being tiltable on said wheels so that its side members may be disposed generally in horizontal supported engagement with the ground in which position said frame crosspiece constitutes a foot piece and the pump is in upright position facilitating the manipulation of the handle as a pump handle, and the frame may be positioned for ground clearance for translation and positioning of the sprayer for spraying use, and a discharge means including a hose connected to the receptacle and the hose being of such length that the spray nozzle thereof may be grasped for manipulation by an operator while the operator is grasping the handle for manipulation of the sprayer on its wheels.

8. A sprayer comprising a frame including laterally spaced side members having a connecting crosspiece at one end thereof and having upwardly projecting converging arms at the other end thereof, the frame side members having upwardly curved portions merging into said arms, an axle disposed on and secured to said frame at the juncture of said side members and arms, wheels on said axle disposed at the outer sides of said frame side members, a cylindrical receptacle disposed horizontally upon said frame side members and fixedly secured thereto in supported relation to said curved portions of said frame side members and to said arms, said wheels being positioned at the ends of said receptacle, an air pump mounted on said receptacle to discharge therein and including a piston rod supportedly carried by and projecting from the receptacle, a handle pivotally mounted on said arms of said frame and operatively associated with said piston rod, said frame being tiltable on said wheels to position its said side members in supported engagement with the ground and in position so that said crosspiece may be engaged by a foot of the operator to stabilize the structure during pumping manipulation of the handle, said frame being tiltable on said wheels by means of said handle to ground clearance position for translation or to position the frame in ground supported position, and a discharge means including a hose connected to the receptacle and provided at its outer end with a valve controlled spray nozzle, the hose being of such length that the spray nozzle thereof may be grasped for manipulation by an operator while the operator is grasping the handle for manipulation of the sprayer on its wheels.

9. A sprayer comprising a frame including laterally spaced side members having upwardly projecting arms at one end thereof, an axle disposed on and secured to said frame at the juncture of said side members and arms, wheels on said axle disposed at the outer sides of said frame side members, a receptacle disposed horizontally upon said frame side members and fixedly secured thereto, an air pump mounted on said receptacle to discharge therein and including a piston rod supportedly carried by and projecting from the receptacle, a handle pivotally mounted on said arms of said frame and operatively associated with said piston rod, said frame being tiltable on said wheels to position its said side members in supported engagement with the ground, said frame being tiltable on said wheels by means on said handle to ground clearance position for translation or to position the frame in ground supported position, and a discharge means including a hose connected to the receptacle and provided at its outer end with a valve controlled spray nozzle, the hose being of such length that the spray nozzle thereof may be grasped for manipulation by an operator while the operator is grasping the handle for manipulation of the sprayer on its wheels.

10. A sprayer comprising a pair of carrying wheels and an axle therefor, a frame mounted on and tiltably supported by said axle and having an upwardly projecting arm at one end thereof, a receptacle disposed upon said frame and fixedly secured thereto in such relation to the axle that the frame may be tilted on said wheels so that the receptacle is in substantially centered vertical position relative to said axle or to position the frame in supported engagement with the ground, an air pump mounted on said receptacle to discharge therein and so positioned thereon that it is in substantially upright position when the frame is in supported engagement with the ground, said air pump including a piston rod supportedly connected to and projecting from the receptacle, and a handle pivotally mounted on said arm and operatively associated with said piston rod so that the handle may be used as a pump handle or as a handle for manipulating the sprayer on its wheels with the frame in tilted position relative to the ground and the receptacle positioned above in substantially vertical alignment with the axle, thereby minimizing the load upon the handle for translation of the sprayer on its wheels or the frame positioned in supported stabilized engagement with the ground, and a discharge hose for said tank provided with a nozzle.

11. In a sprayer the combination of a frame comprising laterally spaced side members connected at one end by a cross piece adapted as a foot piece and having upwardly projecting arms at their other ends, an axle disposed transversely of and fixedly connected to said frame at the juncture of said side pieces and arms, an elongated cylindrical receptacle disposed transversely upon said frame side members and fixedly secured to said frame in supported engagement with said arms with the arms projecting above the plane of the top of the receptacle when the frame is in support engaging position, wheels on said axle disposed at the outer sides of the frame members in partially overlapping relation to the ends of the receptacle, the axle being disposed relative to the frame and the wheels being of such diameter that the wheels are in surface engaging position when the frame is in support engaging position, an air pump comprising a cylinder supportedly mounted on and depending into said receptacle and a piston rod projecting upwardly from the receptacle when the frame is in support engaging position, a combined translating and pump handle pivotally mounted on said arms and operatively associated with said piston rod, said frame being tiltable upon said wheels for translation and for positioning in support engaging position in which position it is supported independently of the handle so that said handle may be used as a pump handle and with the operator positioned for engaging said frame foot piece, and a discharge means including a hose connected to said receptacle and provided at its outer end with a manually manipulatable valved spray nozzle, the hose being of such length that the nozzle thereof may be grasped for manipulation by an operator positioned for grasping the handle and manipulating the sprayer on its wheels, the receptacle being mounted on the frame so that with the handle in sprayer translating position the receptacle is in substantially weight balanced relation relative to the axle.

12. In a sprayer the combination of a frame including laterally spaced side members, a connecting crosspiece therefor and upwardly projecting arms spaced from said cross piece, an axle disposed transversely of and fixedly secured to said frame to project laterally from said frame side members at the juncture of said arms therewith, wheels on said axle disposed at the outer sides of said frame side members, a receptacle fixedly mounted on said frame with said arms projecting upwardly at one side thereof, said frame cross piece being spaced from said receptacle at the side thereof opposite said arms and so that it may be used as a foot piece when the frame is in support engaging position, an air pump mounted on and discharging into said receptacle, a combined sprayer translating and pump handle pivotally mounted on said arms, said frame being tiltable on said axle to and from support engaging position by manipulation of said handle, said handle constituting a pump handle when the frame is in support engaging position with the said crosspiece thereof positioned to be used as a foot piece and with the handle disposed transversely above the receptacle, and a discharge means including a hose connected to the receptacle and provided with a manually manipulatable nozzle, the hose being of such length that the nozzle may be grasped for manipulation by an operator while the operator is positioned for grasping the handle and thereby manipulating the sprayer on its wheels.

13. In a sprayer the combination of a frame comprising laterally spaced side members, a connecting crosspiece adapted as a foot piece and upwardly projecting arms spaced from said crosspiece, an axle disposed transversely of and fixedly secured to said side members and projecting laterally therefrom at the juncture of said arms with said side members, wheels on said axle disposed at the outer sides of the frame side members, a receptacle disposed on and fixedly secured to said frame in supported relation to said arms and with said arms projecting upwardly at one side thereof, said crosspiece being spaced from said receptacle when the frame is in support engaging position so that it may be used as a foot piece, an air pump mounted on and discharging into said receptacle, and a handle pivotally mounted on said arms and adapted as a handle for tilting said frame and translating the sprayer on its wheels and as a handle for said pump, and a discharge hose for said receptacle provided with a manually manipulated nozzle.

14. In a sprayer the combination of a frame having an upwardly projecting arm at one end thereof, an axle mounted on said frame at the inner side of said arm, wheels on said axle disposed at the outer sides of said frame, a receptacle mounted on said frame with portions thereof between said wheels and with said arm projecting upwardly at one side thereof and with said frame projecting from and having a supporting surface engaging portion at the other side of said receptacle, a portion of said projecting portion of said frame being adapted to be engaged by the foot of an operator when the frame is in support engaging position for stabilizing the frame in such position, an air pump mounted on and discharging into said receptacle, a combined sprayer translating and pump handle pivotally mounted on said arm, said frame being tiltably supported on said wheels for adjustment to and from support engaging position by manipulation of said handle and relative to said axle so that it is substantially counterbalanced thereon, said handle also constituting a pump handle when the frame is in support engaging position with said foot engageable portion thereof positioned to be engaged by the foot of an operator manipulating said handle as a pump handle and with the handle disposed transversely above the receptacle, and a discharge means including a hose connected to the receptacle and provided with a manually manipulatable nozzle, the hose being of such length that the nozzle may be grasped for manipulation by an operator while the operator is positioned for grasping the handle and thereby manipulating the sprayer on its wheels.

15. In a sprayer the combination of a frame having an upwardly projecting arm at one end thereof, an axle mounted on said frame at the inner side of said arm, wheels on said axle disposed at the outer sides of said frame, a receptacle mounted on said frame with portions thereof between said wheels and with said arm projecting upwardly at one side thereof, said frame having a supporting surface engaging portion at the other side of said receptacle, an air pump mounted on and discharging into said receptacle, a combined sprayer translating and pump handle pivotally mounted on said arm, said frame being tiltably supported on said wheels for adjustment to and from support engaging position by manipulation of said handle and relative to said axle so that it is substantially counterbalanced thereon, said handle also constituting a pump handle when the frame is in support engaging position with the handle disposed transversely above the receptacle, and a discharge means including a hose connected to the receptacle and provided with a manually manipulatable nozzle, the hose being of such length that the nozzle may be grasped for manipulation by an operator while the operator is positioned for grasping the handle and thereby manipulating the sprayer on its wheels.

References Cited in the file of this patent

UNITED STATES PATENTS

| | | |
|---|---|---|
| 834,064 | Kiefer | Oct. 23, 1906 |
| 1,057,616 | Booz et al. | Apr. 1, 1913 |
| 1,189,932 | Garber | July 4, 1916 |
| 1,293,850 | Mathis | Feb. 11, 1919 |
| 1,339,382 | Barber | May 11, 1920 |
| 1,557,650 | Brandt | Oct. 20, 1925 |
| 1,698,690 | Brandt | Jan. 8, 1929 |
| 2,082,146 | Brandt | June 1, 1937 |
| 2,169,375 | Sanchez | Aug. 15, 1939 |
| 2,518,771 | Gol | Aug. 15, 1950 |
| 2,727,776 | Brownlee et al. | Dec. 20, 1955 |
| 2,770,494 | Nelson | Nov. 13, 1956 |
| 2,818,299 | Payne | Dec. 31, 1957 |

FOREIGN PATENTS

| | | |
|---|---|---|
| 614,501 | France | Sept. 20, 1926 |